(12) United States Patent
Ota et al.

(10) Patent No.: US 6,425,254 B1
(45) Date of Patent: Jul. 30, 2002

(54) CONTROL DEVICE FOR VARIABLE DISPLACEMENT COMPRESSOR

(75) Inventors: Masaki Ota; Masahiro Kawaguchi, both of Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/633,943

(22) Filed: Aug. 8, 2000

(30) Foreign Application Priority Data

Aug. 9, 1999 (JP) ............................................. 11-225330

(51) Int. Cl.⁷ ............................... B60H 1/32; F25B 1/00
(52) U.S. Cl. ......................................... 62/133; 62/228.3
(58) Field of Search ................................ 62/133, 228.3, 62/229; 417/222.2

(56) References Cited

U.S. PATENT DOCUMENTS

| | | | | |
|---|---|---|---|---|
| 5,823,000 A | * | 10/1998 | Takai | 62/133 |
| 6,038,871 A | * | 3/2000 | Gutierrez et al. | 62/133 |
| 6,138,468 A | * | 10/2000 | Yokomachi et al. | 62/133 |

FOREIGN PATENT DOCUMENTS

JP 60-162087 8/1985

\* cited by examiner

*Primary Examiner*—William Wayner
(74) *Attorney, Agent, or Firm*—Morgan & Finnegan, LLP (57) ABSTRACT

A controller for a compressor selects a control procedure from a normal displacement control procedure and a temporary control procedure based on information detected by a detector. When the normal displacement control procedure is selected, the controller sends a current, the value of which is based on the detected information, to an electromagnetic actuator. When the temporary displacement control procedure is selected, the controller sends a current having a specific value to the actuator to maximize a target compressor suction pressure. When switching from the temporary displacement control procedure to the normal displacement control procedure, the controller changes the value of the current supplied to the electromagnetic actuator according to a pattern, which is determined based on the detected information, over a predetermined period. The controller determines the pattern of the current variation during the predetermined period based on the suction pressure during or at the end of the temporary displacement control procedure.

17 Claims, 7 Drawing Sheets

CONTROL DEVICE FOR VARIABLE DISPLACEMENT COMPRESSOR

BACKGROUND OF THE INVENTION

The present invention relates to a variable displacement compressor used in vehicle air conditioners that is driven by a vehicle engine to compress refrigerant gas and changes the pressure in a crank chamber to vary the displacement. More particularly, the present invention pertains to a device for controlling the compressor displacement.

A typical displacement control device for a variable displacement compressor (hereinafter referred to as compressor) includes a control passage. The control passage connects a suction pressure zone with a crank chamber, which accommodates a cam plate. The control device adjusts the pressure in the crank chamber to alter the inclination of the cam plate. The compressor displacement is varied accordingly. The crank chamber is connected to a discharge pressure zone by a supply passage. The supply passage supplies highly pressurized refrigerant gas from the discharge pressure zone to the crank chamber. A displacement control valve is located in the control passage. The opening size of the control valve is changed by a computer, which changes the flow rate of refrigerant gas from the crank chamber to the suction pressure zone. Accordingly, the crank pressure is adjusted.

A typical displacement control valve includes a valve body, a pressure sensing mechanism and an electric actuator. The pressure sensing mechanism moves the valve body in accordance with the pressure of refrigerant gas that is drawn into the compressor (hereinafter referred to as the actual suction pressure). Accordingly, the opening size of the control passage is adjusted. The actuator changes a force acting on the valve body based on the value of a current, which is determined by the computer. A target suction pressure is determined by the value of the current. The target suction pressure is a referential value for the actuation of the pressure sensing mechanism.

When the actual suction pressure exceeds the target suction pressure, the pressure sensing mechanism moves the valve body in a direction increasing the opening size of the control passage. This increases the flow rate of refrigerant gas discharged from the crank chamber to the suction pressure zone and decreases the pressure in the crank chamber. Accordingly, the compressor displacement is increased. When the actual suction pressure drops below the target suction pressure, the pressure sensing mechanism moves the valve body in a direction closing the control passage. This decreases the flow rate of refrigerant gas from the crank chamber to the suction pressure zone, which increases the pressure in the crank chamber. Accordingly, the compressor displacement is decreased.

The electric actuator decreases the target suction pressure, for example, when the value of current from the computer is increased. Thus, the pressure sensing mechanism moves the valve body to adjust the opening size of the control passage for maintaining a lower actual suction pressure. When the value of the current is decreased, the actuator increases the target suction pressure. Therefore, the pressure sensing mechanism moves the valve body to adjust the control passage for maintaining a high actual suction pressure. When the current value is zero, the actuator maximizes the target suction pressure. In this case, the actual suction pressure is significantly lower than the target suction pressure. The pressure sensing mechanism then fully closes the control passage so that the difference between the actual suction pressure and the target suction pressure will be eliminated.

Figures 7A, 7B, 7C:
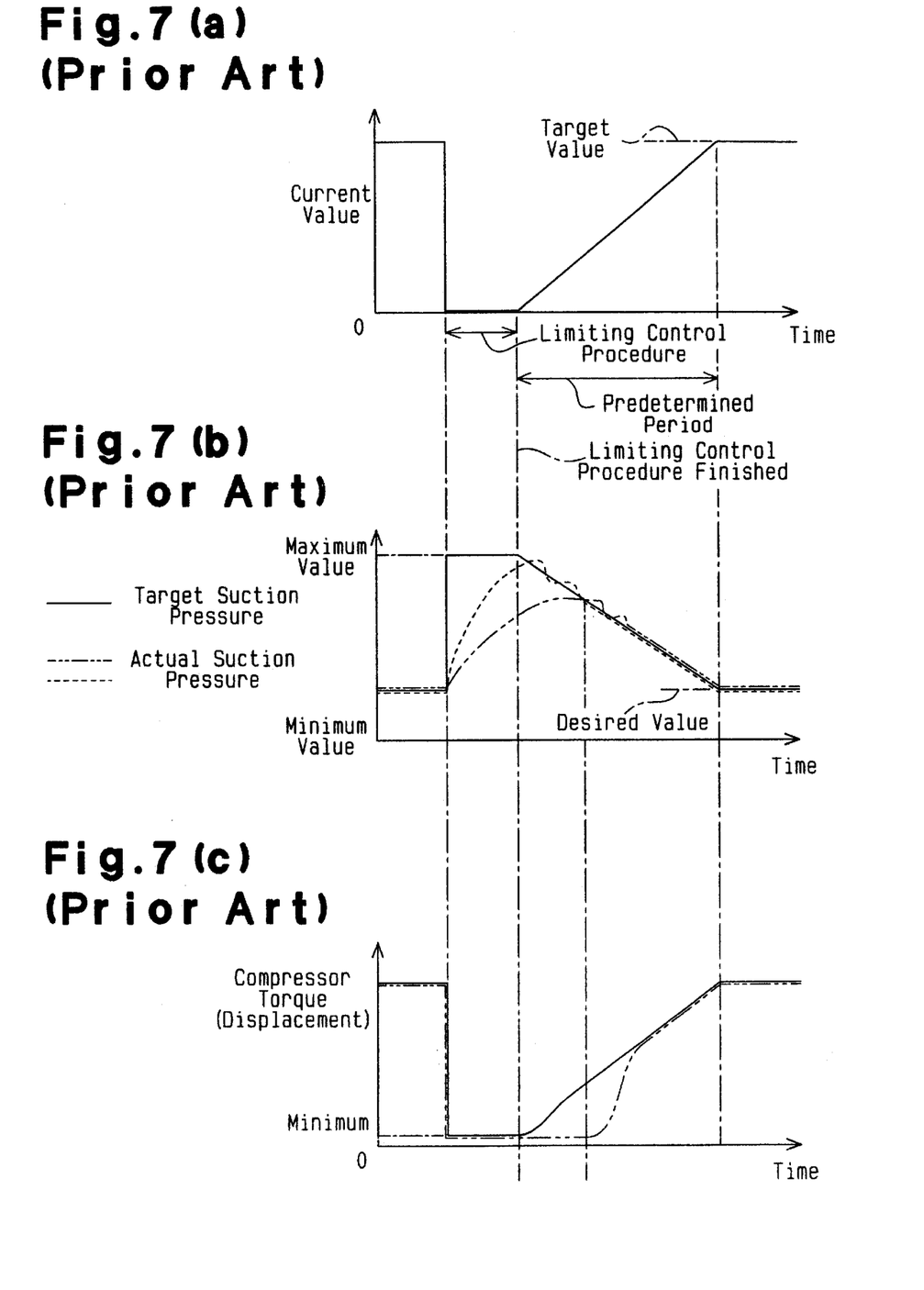
FIGS. 7(a) to 7(c) are timing charts showing characteristics of a prior art control unit.

The load on a vehicle engine increases, for example, when the vehicle is rapidly accelerated. In such a case, the above described control device minimizes the compressor displacement to decrease the engine load. This is referred to as a displacement limiting control procedure. As shown in FIG. 7(a), when a vehicle is rapidly accelerated, the computer stops the supply of current to the electric actuator of the displacement control valve. Also, the computer maximizes the target suction pressure as shown in FIG. 7(b) to minimize the compressor displacement. Accordingly, the torque generated by compression reaction of the compressor is decreased as shown in FIG. 7(c).

The displacement limiting control procedure is finished when a predetermined period has elapsed after the procedure was initiated. Thereafter, a normal compressor control procedure, which is performed according to the cooling load, is started. The computer increases the value of the current supplied to the actuator from zero to a value that corresponds to the cooling load. That is, the computer decreases the target suction pressure from the maximum value to a desired value that corresponds, to the cooling load.

However, if the target suction pressure suddenly drops from the maximum value to the desired value, the actual suction pressure cannot follow the sudden change of the target suction pressure. That is, the actual suction pressure is temporarily significantly greater than the target suction pressure. The pressure sensing mechanism quickly increases the opening size of the control passage, which suddenly decreases the pressure in the crank chamber and suddenly increases the compressor displacement. As a result, the torque of the compressor is suddenly increased, which significantly lowers the engine speed and performance.

Therefore, as shown in FIG. 7(a), the computer linearly increases the value of actuator current from zero to a target value with a slope as shown in FIG. 7(a), over a certain period. In other words, the computer linearly decreases the target suction pressure from the maximum value to the desired value over the certain period, as shown in FIG. 7(b). Therefore, when the displacement limiting control procedure is finished, the actual suction pressure does not significantly exceed the target suction pressure. The compressor displacement, or the torque of the compressor, is gradually increased as shown in FIG. 7(c). The engine performance is thus improved.

A uniformly dashed line and a line made up of one long and two short dashes represent changes of the actual suction pressure in two different cases. Although the target suction pressure and the actual suction pressure are the same in the two cases before the displacement limiting control procedure is started, the actual suction pressure differs between the two cases at the end of the displacement limiting control procedure. In the normal control procedure, the target suction pressure is changed in accordance with the demand for cooling by the passengers, which is indicated by a target passenger compartment temperature. Therefore, depending on the target compartment temperature, which is set by a passenger, the target suction pressure may have the same value for different compartment temperatures. Even if the target suction pressure is the same in different performances of the displacement limiting control procedure, the evaporation amount of refrigerant in the evaporator may be different. Accordingly, the actual suction pressure may vary at the end of each displacement limiting control procedure.

For example, if the actual suction pressure increases too slowly as illustrated by the line having one long and two short dashes in FIG. 7(b), the actual suction pressure is significantly lower than the target suction pressure when the displacement limiting control procedure is completed. Therefore, the actual suction pressure surpasses the target suction pressure and the pressure sensing mechanism moves the valve body in a direction to lower the pressure in the crank chamber only when a relatively long time has elapsed after the displacement limiting control procedure is completed. As a result, the compressor displacement is increased from the minimum value only when a long period elapsed after the limiting control procedure is completed, as illustrated by the line having. one long and two short dashes in FIG. 7(c). When the occurs, the compartment temperature may rise significantly from the temperature that existed before the displacement limiting control procedure was started, which disturbs the passengers.

As described above, the control device linearly increases the value of the current supplied to the electric actuator, over the certain period, when switching from the displacement limiting control procedure to the normal control procedure. The slope of the current increase line, see FIG. 7(a), is determined based on the expected value of the actual suction pressure at the end of the displacement limiting control procedure. However, the actual suction pressure may vary when the displacement limiting control procedure is completed and may be different from the expected actual suction pressure. Therefore, when the compressor displacement is restored from the minimum value to a value that corresponds to the cooling load, the restoration characteristics vary.

SUMMARY OF THE INVENTION

Accordingly, it is an objective of the present invention to provide a displacement control device for variable displacement compressors that quickly restores a compressor displacement from the minimum value to a value that corresponds to the cooling load regardless of the suction pressure when a temporary displacement control procedure is completed.

To achieve the foregoing and other objectives and in accordance with the purpose of the present invention, a displacement control device for a compressor that draws and compresses refrigerant gas and changes the displacement in accordance with the pressure in a controlled pressure chamber is provided. The device includes a control valve, a detector and a controller. The control valve controls the pressure in the controlled pressure chamber. The control valve has a valve body, a pressure sensing mechanism and an electromagnetic actuator. The pressure sensing mechanism displaces the valve body in accordance with the pressure of refrigerant gas drawn into the compressor. The electromagnetic actuator adjusts a force applied to the valve body based on the value of a current supplied to the electromagnetic actuator, thereby changing a target suction pressure, which is a reference value for the operation of the pressure sensing mechanism. The detector detects the pressure of refrigerant gas that is drawn into the compressor. The controller selects a control procedure from a normal displacement control procedure and a temporary displacement control procedure based on the suction pressure detected by the detector. When the normal displacement control procedure is selected, the controller sends a current, the value of which is based on external information, to the electromagnetic actuator. When the temporary displacement control procedure is selected, the controller sends a current having a specific value to the actuator to maximize the target suction pressure. When switching from the temporary displacement control procedure to the normal displacement control procedure, the controller changes the value of the current supplied to the electromagnetic actuator to a predetermined target value over a predetermined period, and determines the pattern of change of the current to the electromagnetic actuator during the predetermined period based on the suction pressure during or at the end of the temporary displacement control procedure.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
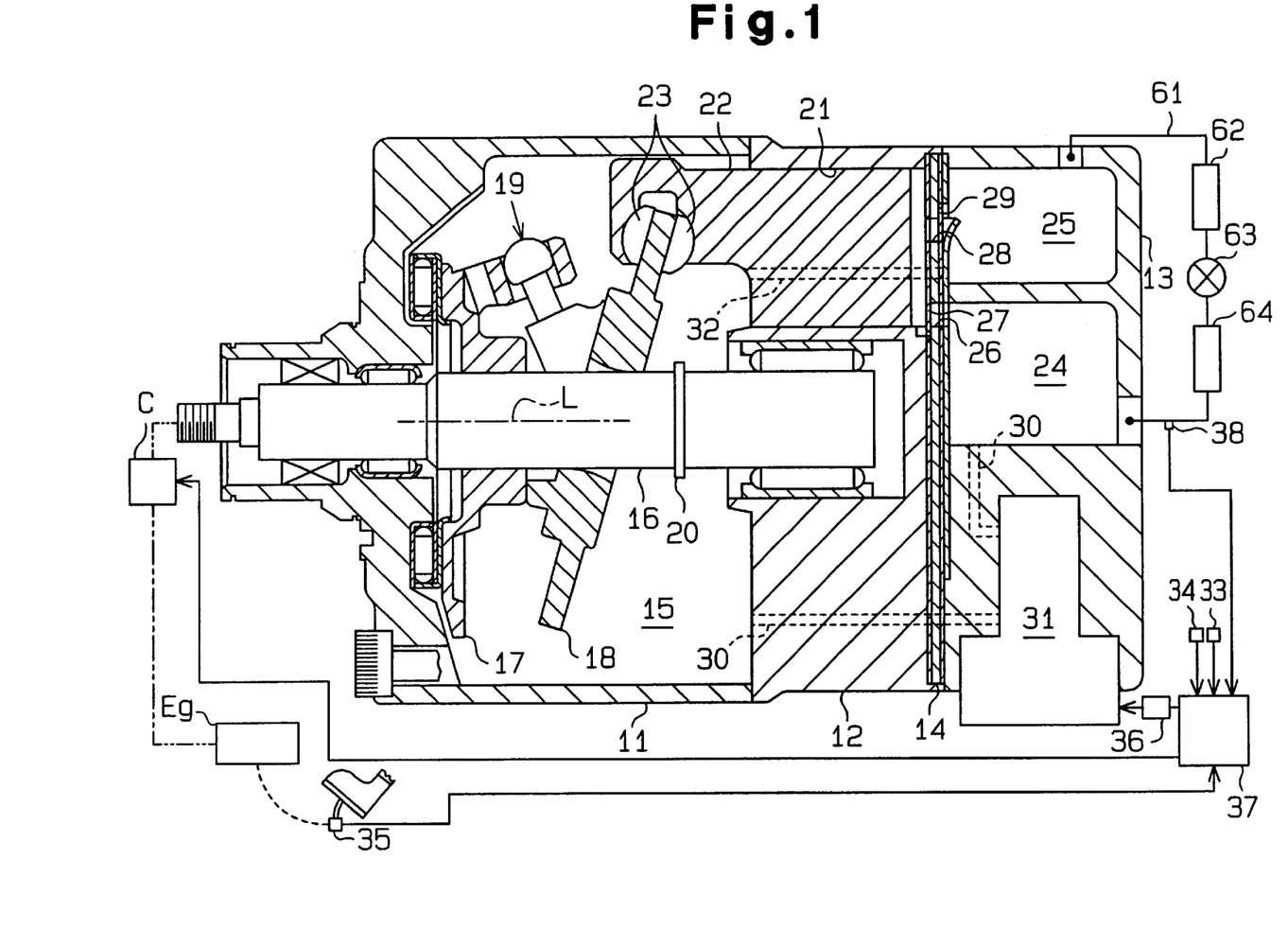
FIG. 1 is a cross-sectional view illustrating a variable displacement compressor.

One embodiment according to the present invention will be described with reference to FIGS. 1 to 4(c). First, the structure of a variable displacement compressor will be described. As shown in FIG. 1, a front housing member 11 is coupled to the front end of a cylinder block 12. A rear housing member 13 is coupled to the rear end of the cylinder block 12 through a valve plate assembly 14. A controlled pressure chamber, which is a crank chamber 15 in this embodiment, is defined by the front housing member 11 and the cylinder block 12.

A drive shaft 16 is supported by the front housing member 11 and the cylinder block 12 to extend through the crank chamber 15. The drive shaft 16 is coupled to an external drive source, which is a vehicle engine E in this embodiment, through a clutch mechanism C such as an electromagnetic clutch. The clutch mechanism C selectively transmits the torque of the engine Eg to the drive shaft 16.

A rotary support 17 is fixed to the drive shaft 16 in the crank chamber 15. A drive plate, which is a swash plate 18 in this embodiment, is supported on the drive shaft 16. The swash plate 18 slides along and inclines relative to the axis L of the drive shaft 16. A hinge mechanism 19 is located between the rotary support 17 and the swash plate 18. The swash plate 18 is connected to the rotary support 17 through the hinge mechanism 19. The hinge mechanism 19 causes the swash plate 18 to rotate integrally with the rotary support 17. Further, the hinge mechanism 19 guides the sliding and the inclination of the swash plate 18 with respect to the drive shaft 16.

Figure 3:
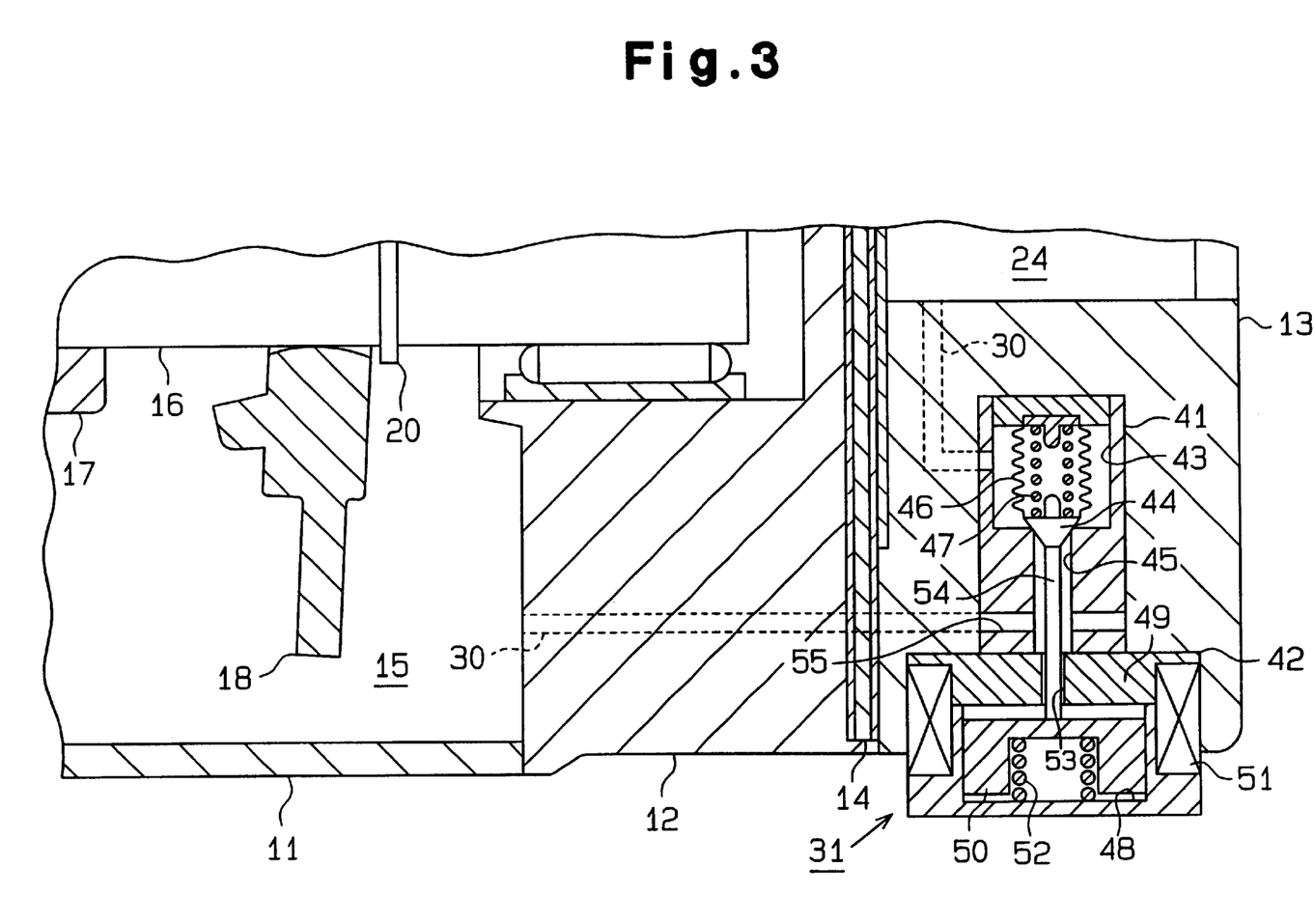
FIG. 3 is an enlarged partial cross-sectional view illustrating the compressor of FIG. 1 when the compressor displacement minimum.

As the center portion of the swash plate 18 is moved toward the rotary support 17, the inclination angle of the swash plate 18 increases. On the other hand, as the center portion of the swash plate 18 is moved toward the cylinder block 12, the inclination angle of the swash plate 18 decreases. A limit ring 20 is mounted on the drive shaft 16 between the swash plate 18 and the cylinder block 12. As shown in FIG. 1, when the swash plate 18 contacts the rotary support 17, the inclination angle of the swash plate 18 becomes maximum. As shown in FIG. 3, when the swash plate 18 contacts the limit ring 20 the inclination angle of the swash plate 18 is minimized.

Cylinder bores 21 (only one is shown in FIG. 1) extend through the cylinder block 12 to surround the drive shaft 16. A single-headed piston 22 is accommodated in each cylinder bore 21. Each piston 22 is coupled to the periphery of the swash plate 18 through a pair of shoes 23. The swash plate 18 converts rotation of the drive shaft 16 to reciprocation of each piston 22 in the corresponding cylinder bore 21.

A suction chamber 24, which is in a suction pressure zone, and a discharge chamber 25, which is in a discharge pressure zone, are formed in the rear housing member 13. Suction ports 26, suction valve flaps 27, discharge ports 28 and discharge valves flap 29 are formed in the valve plate assembly 14. Each set of the ports 26, 28 and the valve flaps 27, 29 corresponds to one of the cylinder bores 21.

When each piston 22 is moved from the top dead center position to the bottom dead center position, refrigerant gas is drawn into the corresponding cylinder bore 21 from the suction chamber 24 through the corresponding suction port 26 and the corresponding suction valve flap 27. When each piston 22 is moved from the bottom dead center position to the top dead center position, the refrigerant gas is compressed to a predetermined pressure in the cylinder bore 21 and is then discharged to the discharge chamber 25 through the corresponding discharge port 28 and the corresponding discharge valve flap 29. When each piston 22 compresses the gas in the associated cylinder bore 21, refrigerant gas in the cylinder bore 21 leaks into the crank chamber 15 between the surface of the piston 22 and the wall of the cylinder bore 21. The leaking gas is referred to as blowby gas.

An external refrigerant circuit 61 connects the suction chamber 24 to the discharge chamber 25. The external refrigerant circuit 61 includes a condenser 62, an expansion valve 63 and an evaporator 64. The compressor and the external refrigerant circuit 61 form a refrigeration circuit for a vehicle air-conditioner.

As shown in FIG. 1, a control passage, which is a bleed passage 30 in this embodiment, connects the crank chamber 15 to the suction chamber 24. A displacement control valve 31 is accommodated in the rear housing 13 to regulate the bleed passage 30. A supply passage 32 connects the discharge chamber 25 to the crank chamber 15. The highly pressurized refrigerant gas in the discharge chamber 25 is supplied to the crank chamber 15 through the supply passage 32.

A temperature adjuster 33 for setting the target value of the temperature in a passenger compartment, a passenger compartment temperature sensor 34, a pedal position sensor 35, the clutch mechanism C and the control valve 31 are connected to a computer 37. The pedal position sensor 35 detects the degree of depression of the vehicle accelerator pedal, that is, the position of the accelerator pedal. The computer 37 is connected to the control valve 31 through a drive circuit 36. The temperature adjuster 33, the temperature sensor 34 and the pedal position sensor 35 form an external state detecting means or an external state detecting device.

Figure 2:
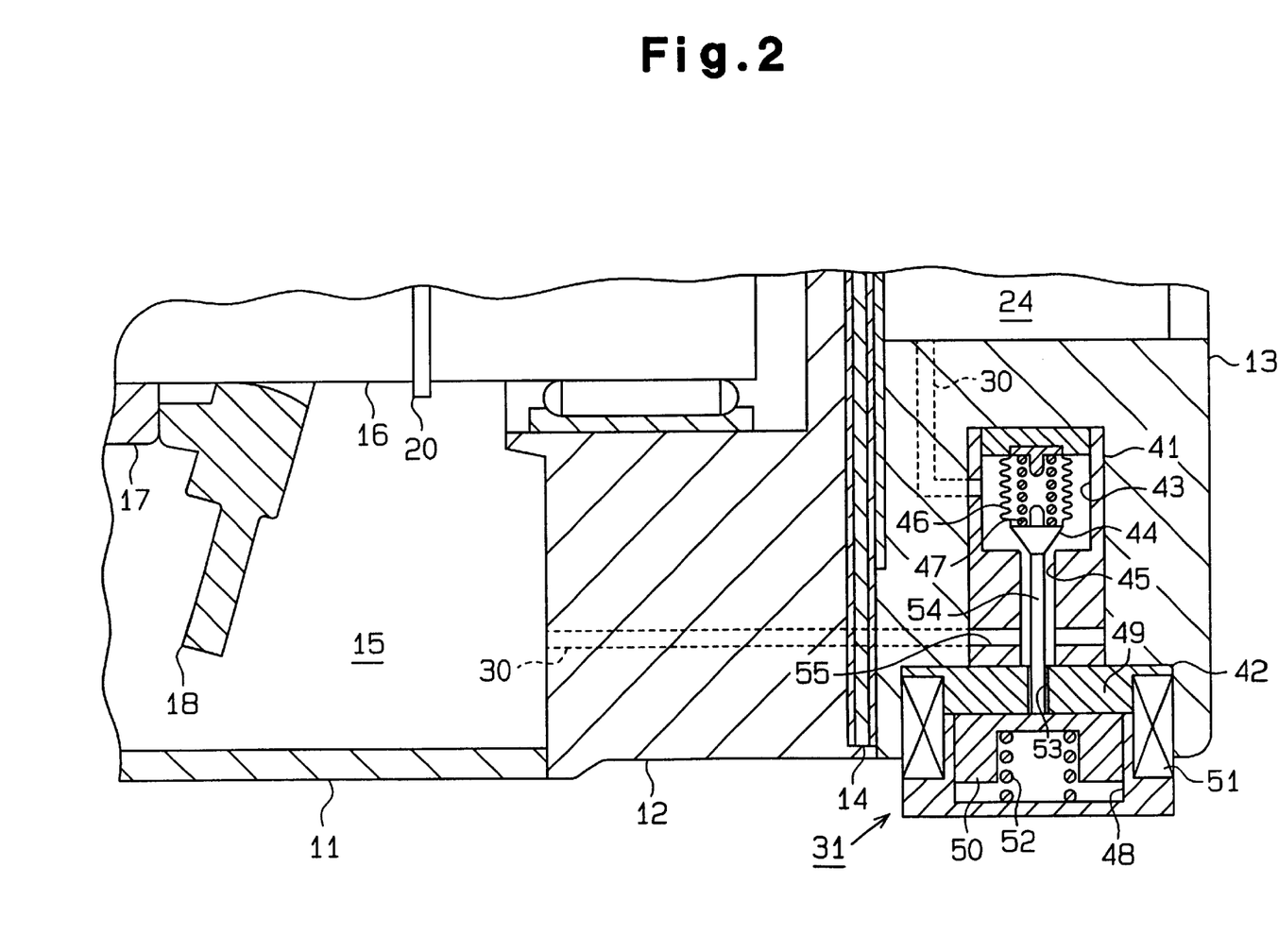
FIG. 2 is an enlarged partial cross-sectional view illustrating the compressor of FIG. 1 when the compressor displacement is maximum.

The control valve 31 will now be described. As shown in FIGS. 2 and 3, the control valve 31 has a valve housing 41 and a solenoid unit 42, which are coupled to each other. A valve chamber 43, which also serves as a pressure sensing chamber, is formed in the valve housing 41. A valve body 44 is located in the valve chamber 43. A valve hole 45 extends axially in the valve housing 41. The valve hole 45 opens to the valve chamber 43 to face the valve body 44. The valve chamber 43 is connected to the suction chamber 24 through the downstream portion of the bleed passage 30.

A pressure sensing member, which is a bellows 46 in this embodiment, is housed in the valve chamber 43. The top end of the bellows 46 is fixed to the upper wall of the valve chamber 43 and the lower end of the bellows 46 is connected to the valve body 44. A setting spring 47 is located in the bellows 46. The setting spring 47 sets the initial length of the bellows 46. The valve chamber 43, the bellows 46 and the setting spring 47 form a pressure sensing mechanism.

The solenoid unit 42, or the electromagnetic actuator, has a plunger chamber 48. A fixed core 49 is fitted in the upper opening of the plunger chamber 48. A plunger 50 is housed in the plunger chamber 48. A cylindrical coil 51 is located radially outside of the fixed core 49 and the plunger 50. The drive circuit 36 is connected to the coil 51. A follower spring 52 is located between the plunger 50 and the bottom wall of the plunger chamber 48 and urges the plunger 50 toward the fixed core 49.

A guide hole 53 extends through the fixed core 49 and is coaxial with the valve hole 45. A transmission rod 54 extends through the guide hole 53 and the valve hole 45. The proximal end of the transmission rod 54 is fixed to the plunger 50. The follower spring 52 urges the transmission rod 54 through the plunger 50 toward the valve body 44, which causes the distal end of the transmission rod 54 to contact the valve body 44. In other words, the plunger 50 and the valve body 44 are coupled to each other by the transmission rod 54. The valve body 44 is urged in a direction to open the valve hole 45 by the follower spring 52.

A port 55 is formed in the valve housing 41 between the valve chamber 43 and the plunger chamber 48. The valve hole 45 is connected to the crank chamber 15 through the port 55 and the upstream portion of the bleed passage 30. The valve chamber 43, the valve hole 45 and the port 55 form part of the bleed passage 30.

If an air conditioner starting switch (not shown) is turned on and the temperature detected by the temperature sensor 34 is higher than a target temperature set by the temperature adjuster 33 while the engine Eg is running, the computer 37 activates, or engages, the clutch mechanism C, which starts the compressor.

The computer 37 determines the cooling performance required for the refrigeration circuit based on signals from the temperature adjuster 33 and the temperature sensor 34. Accordingly, the computer 37 determines the value of current supplied to the coil 51. The computer 37 supplies the current of the determined value to the coil 51 through the drive circuit 36. Then, an electromagnetic force based on the supplied current is generated between the fixed core 49 and the plunger 50. The magnitude of the attraction force represents the target value of the pressure in the suction chamber 24 (target suction pressure). The attraction force urges the valve body 44 through the transmission rod 54 in a direction increasing the opening size of the valve hole 45.

The bellows 46 of the control valve 31 expands and contracts in accordance with the pressure in the valve chamber 43. In other words, the bellows 46 applies a force, the magnitude of which corresponds to the pressure in the valve chamber 43, to the valve body 44. The pressure (suction pressure) in the suction chamber 24 is applied to the valve chamber 43 through the downstream portion of the bleed passage 30. Therefore, the valve chamber 43 is exposed to the suction pressure.

The suction pressure in the valve chamber 43 urges the valve body 44 away from the valve hole 45. The valve body 44 is exposed to the pressure (crank pressure) in the crank chamber 15 through the upstream portion of the bleed passage 30, the port 55 and the valve hole 45. The crank pressure urges the valve body 44 away from the valve hole 45.

The forces that act on the valve body 44 determine the position of the valve body 44 with respect to the valve hole 45, that is, the opening size of the valve hole 45.

The higher the passenger compartment temperature is with respect to the target temperature, in other words, the greater the cooling performance required for the refrigeration circuit is, the greater the supplied current value for the coil 51 is, as determined by the computer 37. Accordingly, the attraction force between the fixed core 49 and the plunger 50 becomes stronger and the force that urges the valve body 44 away from the valve hole 45 increases. Therefore the target suction pressure is set at a lower value. The bellows 46 causes the valve body 44 to adjust the opening size of the valve hole 45 such that the actual suction pressure is directed to the lower target suction pressure. That is, the greater the supplied current value to the coil 51 is, the lower the suction pressure level that is set by the control valve 31 is. The control valve 31 varies the suction pressure by varying the displacement of the compressor.

If the actual suction pressure is higher than the target suction pressure, the bellows 46 causes the valve body 44 to increase the opening size of the valve hole 45. Then, the flow rate of the refrigerant gas discharged to the suction chamber 24 from the crank chamber 15 through the bleed passage 30 increases, and the pressure in the crank chamber -15 decreases. Thus, the inclination angle of the swash plate 18 increases and the displacement of the compressor increases. The increase in the compressor displacement increases the cooling performance of the refrigeration circuit and decreases the actual suction pressure so that the actual suction pressure seeks the target suction pressure.

When the valve body 44 fully opens the valve hole 45, a great amount of refrigerant gas is discharged from the crank chamber 15 to the suction chamber 24, which significantly decreases the pressure in the crank chamber 15. Accordingly, the inclination angle of the swash plate 18 is maximized and the displacement of the compressor is maximized (see FIG. 2).

The smaller the difference between the passenger compartment temperature and the target temperature is, in other words, the smaller the cooling performance required for the refrigeration circuit is, the smaller the value of the current value supplied to the coil 51 is. Accordingly, the attraction force between the, fixed core 49 and the plunger 50 is decreased and the force that urges the valve body 44 away from the valve hole 45 decreases. The target suction pressure is therefore set at a higher value. The bellows 46 causes the valve body 44 to adjust the opening size of the valve hole 45 so that the actual suction pressure is directed to the higher target suction pressure. That is, the smaller the supplied current value for the coil 51 is, the higher the suction pressure level that is set by the control valve 31 is. The control valve 31 adjusts the suction pressure by adjusting the compressor displacement.

If the actual suction pressure is lower than the target suction pressure, the bellows 46 causes the valve body 44 to decrease the opening size of the valve hole 45. Then, the flow rate of the refrigerant gas discharged to the suction chamber 24 from the crank chamber 15 through the bleed passage 30 decreases, and the pressure in the crank chamber 15 increases. Thus, the inclination angle of the swash plate 18 is decreased and the displacement of the compressor is decreased. The decrease in the compressor displacement decreases the cooling performance of the refrigeration circuit and increases the actual suction pressure so that the actual suction pressure seeks the target suction pressure.

When the valve body 44 fully closes the valve hole 45, no refrigerant gas is discharged from the crank chamber 15 to the suction chamber 24, which significantly increases the pressure in the crank chamber 15. Accordingly, the inclination angle of the swash plate 18 is minimized and the displacement of the compressor is minimized (see FIG. 3).

As described above, the displacement of the compressor is usually adjusted according to the cooling performance required for the refrigeration circuit. However, when the load on the engine Eg abruptly increases during rapid acceleration of the vehicle, a displacement limiting control procedure for reducing the engine load is performed. The displacement limiting control procedure temporarily minimizes the displacement of the compressor.

To reduce the engine load during rapid acceleration, a clutch mechanism C may be disengaged to temporarily disconnect the compressor from the engine Eg. However, to ensure the minimum cooling performance even during rapid acceleration of the vehicle and to avoid the shock that accompanies engagement and disengagement of the clutch mechanism C, temporary disengagement of the clutch mechanism C is not favored.

The displacement limiting control procedure performed when the vehicle is accelerating will now be described with reference to timing charts of FIGS. 4(a) to 4(c). When the pedal position detected by the pedal sensor 35 exceeds a predetermined value, the computer 37 determines that the vehicle will quickly accelerate. In this case, the computer 37 initiates the displacement limiting control procedure. That is, the computer 37 commands the drive circuit 36 to lower the value Ix of current supplied to the coil 51 to zero from a value that corresponds to the cooling load as shown in FIG. 4(a).

Figure 4A:
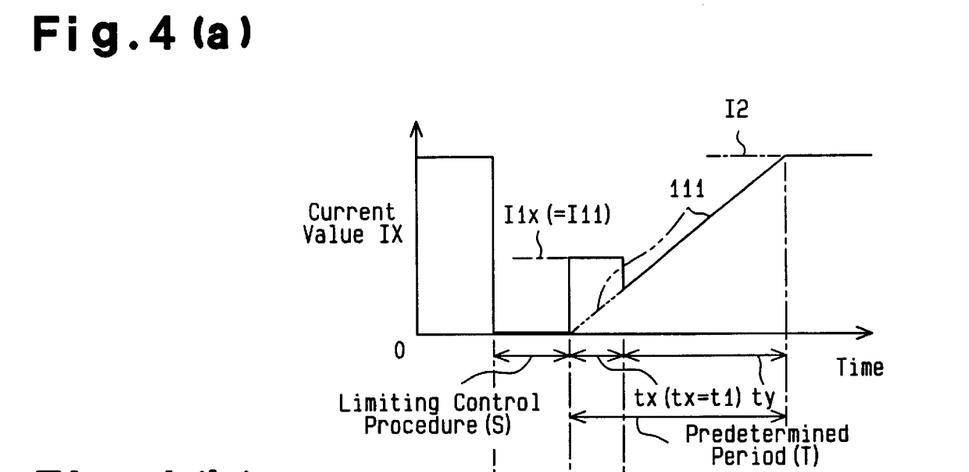
FIGS. 4(a) to 4(c) are timing charts showing characteristics of a control device.
Figure 4B:
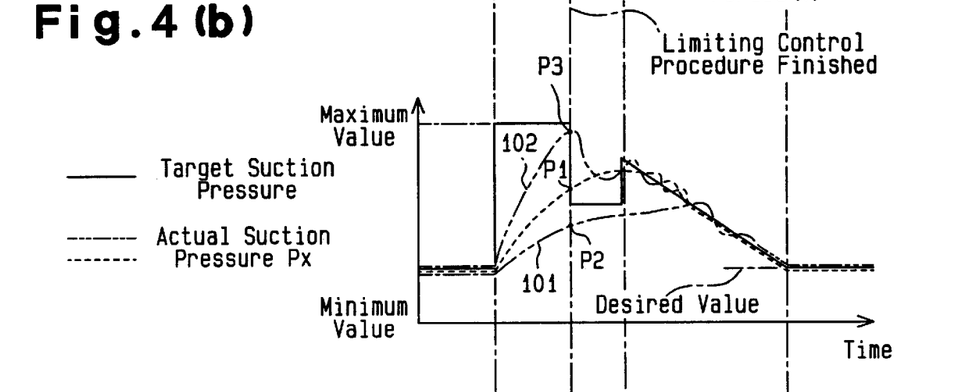

Accordingly, the target suction pressure of the control valve 31 increases from a value that corresponds to the cooling load to the maximum value as shown in FIG. 4(b). In this state, the actual suction pressure Px is significantly lower than the target suction pressure. As a result, the bellows 46 moves the valve body 44 to fully close the valve hole 45 so that the difference between the actual suction pressure Px and the target suction pressure will be eliminated. Therefore, the crank pressure increases, which minimizes the compressor displacement as shown in FIG. 4(c). Accordingly, the compressor torque is minimized, which reduces the load on the engine Eg. The reduced engine load permits the engine Eg to quickly accelerate the vehicle.

The computer 37 terminates the displacement limiting control procedure after a predetermined period S (for example, one second) and switches to the normal control procedure, which is based on the cooling load. That is, the computer 37 increases the value Ix of current supplied to the coil 51 from zero to a value I2 that corresponds to the cooling load, as shown in FIG. 4(a). Accordingly, the target suction pressure is lowered from the maximum value to a value that corresponds to the cooling load as shown in FIG. 4(b). The computer 37 increases the value Ix of the current to the coil 51 from zero to the target value I2 over a predetermined period T (seconds). That is, computer 37 lowers the target suction pressure from the maximum value to a desired value over the period T.

In a first time segment tx (seconds) in the period T, the value of current to the coil 51 is set to a value I1x, which is greater than a value corresponding to a simple sloping line 111 extending from zero to the target value, as shown in FIG. 4(a). Thus, as shown in FIG. 4(b), the target suction pressure is lower than values on a simple sloping line extending from the maximum value to the desired value in the first time segment tx.

As shown in FIG. 4(a), the current value Ix is instantaneously increased from zero to the first value I1x when the displacement limiting control procedure is finished. Then the current value Ix is maintained at I1x during the time segment tx. Therefore, as shown by the uniformly dashed line in FIG. 4(b), the actual suction pressure Px is sufficiently higher than the target suction pressure immediately after the displacement limiting control procedure is terminated. In this state, the bellows 46 moves the valve body 44 to widely open the valve hole 45. As a result, the crank pressure quickly decreases. The compressor torque is increased from the minimum value without a significant delay from the end of the displacement limiting control procedure (see the solid line in FIG. 4(c)).

As shown in FIG. 4(a), when the time segment tx elapses, the current value Ix is instantaneously decreased from the first value I1x to a value on the simple sloping line 111. Thus, the actual suction pressure Px, which is shown by the uniformly dashed line in FIG. 4(b), is higher than the target suction pressure only for a short period (tx seconds). Thereafter, the bellows 46 moves the valve body 44 to decrease the opening size of the valve hole 45. As a result, the crank pressure is prevented from falling excessively. Thus, the compressor displacement is not suddenly increased from the minimum displacement (see solid line in FIG. 4(c)).

In a second time segment ty (seconds: ty=T−tx) after the time segment tx, the current value Ix is determined in accordance with the simple sloping line 111 shown in FIG. 4(a). In the second time segment ty, the actual suction pressure Px is substantially equal to the target suction pressure (see FIG. 4(b)). The load on the compressor increases along a straight line (see the solid line in FIG. 4(c)).

If the displacement limiting control procedure is performed several times from the same initial target suction pressure when the initial actual suction pressure is substantially equal to the target suction pressure, the actual suction pressure Px may vary as illustrated by dashed lines 101 and 102 at the end of each displacement limiting control procedure. For example, if the control procedure is performed three times, the actual suction pressures P1, P2, P3 at the end of each control procedure may have the values as shown in FIG. 4(b). That is, an inequality (P3>P1>P2) is satisfied.

If the actual suction pressure Px is increased slowly as shown by line 101 in FIG. 4(b) and the current value Ix is changed along the pattern shown in FIG. 4(a), the actual suction pressure Px (Px=P2<P1) is lower than the target suction pressure at the end of the displacement limiting control procedure. In this case, it is only after a significantly great time has elapsed from the end of the displacement limiting control procedure that the actual suction pressure Px exceeds the target suction pressure and the valve body 44 is moved to decrease the crank pressure. As a result, as shown by line 103 in FIG. 4(c), the compressor displacement is increased from the minimum displacement only after a significant time has elapsed from the end of the displacement limiting control procedure, which significantly increases the compartment temperature compared to the temperature before the displacement limiting control procedure. The passengers will therefore feel some discomfort.

If the actual suction pressure Px is suddenly increased as shown by the dashed line 102 in FIG. 4(b) and the current value Ix is changed along the as shown in FIG. 4(a), the actual suction pressure Px (Px=P3>P1) is significantly higher than the target suction pressure at the end of the displacement limiting control procedure. In this case, the crank pressure suddenly drops immediately after the displacement limiting control procedure is terminated as shown by the dashed line 104 in FIG. 4(c), which abruptly increases the compressor displacement. Accordingly, the engine performance is hindered.

In this embodiment, the target suction pressure changes according to the solid line in FIG. 4(b), and the current value Ix changes according to the solid line in FIG. 4(a). In other words, the pattern of change of the target suction pressure shown by the solid line in FIG. 4(b) occurs when the length of the first time segment tx is t1 and the first value I1X is equal to I11. According to the pattern of the current value Ix in FIG. 4(a), the compressor displacement is restored from the minimum displacement to a value that corresponds to the cooling load along the solid line shown in FIG. 4(c) only when the actual suction pressure Px is equal to the value P1 at the end of the displacement limiting control procedure.

This embodiment has the following characteristics.

The control device includes the suction pressure sensor 38. The suction pressure sensor 38 is located in a pipe of the external refrigerant circuit 61 that connects the evaporator 64 to the suction chamber 24 of the compressor C. The suction pressure sensor 38 detects the pressure of refrigerant gas in the pipe, or the actual suction pressure Px.

As shown in FIGS. 4(a) to 6(b), the computer 37 determines the pattern of change of the current value Ix supplied to the coil 51 during the predetermined period T based on the actual suction pressure Px at the end of the displacement limiting control procedure. The pattern of the current value Ix is determined by modifying the simple sloping line 111, which extends from zero to the target current value I2. Specifically, the duration of the time segment tx and the first value I1x are changed based on the actual suction pressure Px, which is detected by the suction pressure sensor 38. The first time segment tx and the first value I1X are stored in the computer 37 as a map, which has the actual suction pressure Px as a parameter.

In the state shown by line 101 in FIG. 4(b), the actual suction pressure Px at the end of the displacement limiting control procedure is equal to the value P2. The computer 37 selects the duration of the first time segment tx and the first value I1x based on the actual suction pressure P2. The selected first segment tx is a value t2, which is shorter than the value t1 (t2<t1), and the selected first value I1x is a value I12, which is greater than the value I11 (I12>I11). The computer 37 changes the pattern of the current value Ix in the period T to the pattern shown in FIG. 5(a). As a result, as shown in FIG. 5(b), the actual suction pressure P2 is significantly higher than the target suction pressure at the end of the displacement limiting control procedure. Accordingly, the compressor displacement is restored along the solid line in FIG. 4(c).

Figure 4C:
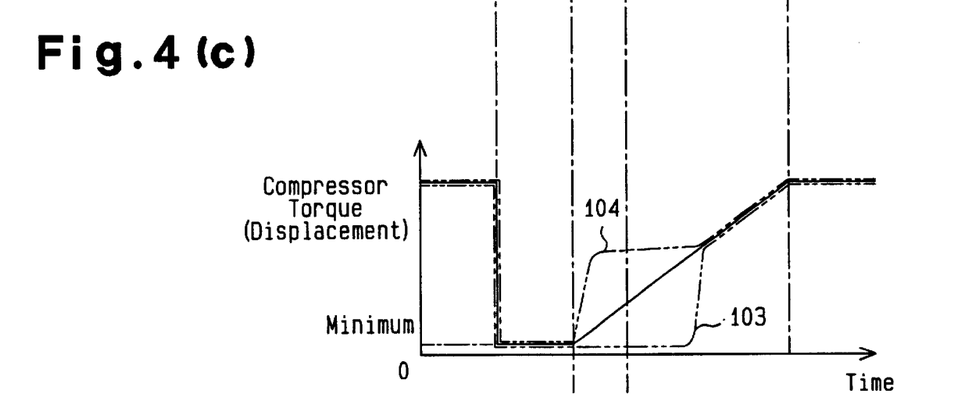
Figures 5A, 5B:
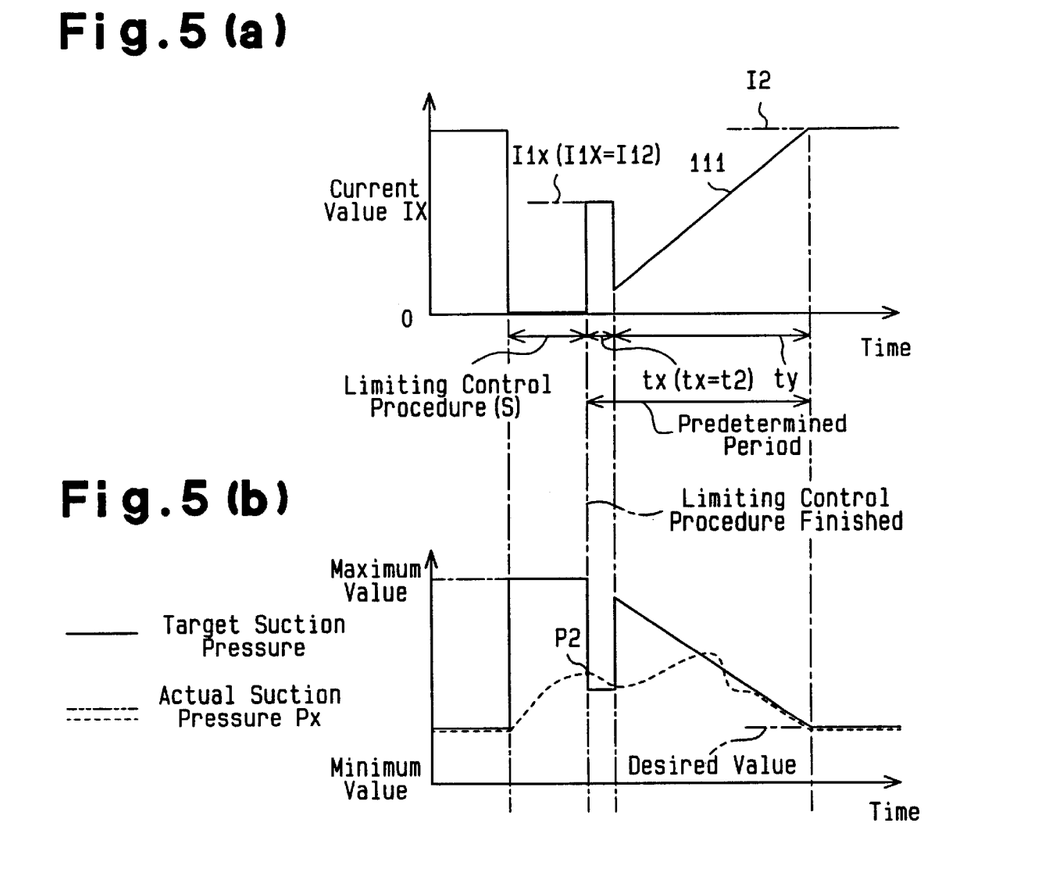
FIGS. 5(a) and 5(b) are timing charts showing characteristics of a control device.
Figure 6A:
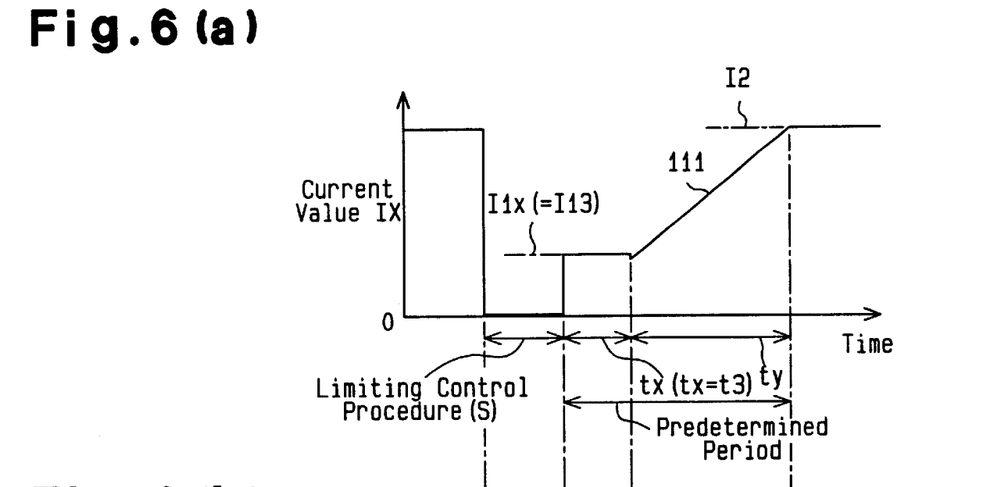
FIGS. 6(a) and 6(b) are timing charts showing characteristics of a control device.
Figure 6B:
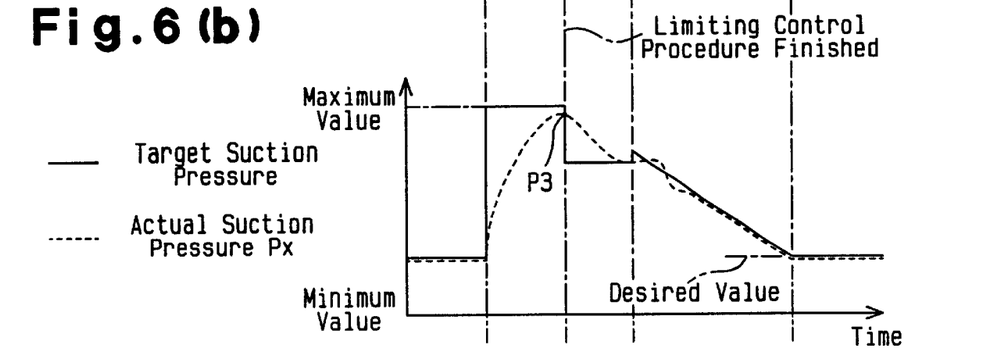

In the case shown by line 102 in FIG. 4(*b*), the actual suction pressure Px is P3 at the end of the displacement limiting control procedure. The computer 37 selects values t3 and I13 for the first period tx and the first value I1x, respectively. The value t3 is longer than t1 (t3>t1), and the value I13 is smaller than the value I11 (I13<I11). The computer 37 changes the pattern of the current Ix to the coil 51, for example, according to FIG. 6(*a*). Thus, as shown in FIG. 6(*b*), the actual suction pressure P3 is significantly higher than the target suction pressure at the end of the displacement limiting control procedure. Therefore, the compressor displacement changes along the solid line in FIG. 4(*c*).

According to the embodiment of FIGS. 1 to 6(*b*), when the displacement limiting control procedure is terminated and the normal control procedure takes over, the current value Ix to the coil 51 during the period T is determined based on the actual suction pressure Px at the end of the displacement limiting control procedure. Therefore, even if the actual suction pressure Px varies at the end of the displacement limiting control procedure, the compressor displacement is restored by desired restoration characteristics.

It should be apparent to those skilled in the art that the present invention may be embodied in many other specific forms without departing from the spirit or scope of the invention. Particularly, it should be understood that the invention may be embodied in the following forms.

The computer 37 may predict the actual suction pressure Px at the end of the displacement limiting control procedure based on the suction pressure Px during the displacement limiting control procedure, and may determine the pattern of change of the value Ix when switching to the normal control procedure, accordingly.

The present invention may be embodied in a control device of a compressor in which a control valve only changes the opening size of the supply passage 32 to change the displacement.

The present invention may be embodied in a control device of a compressor in which a control valve changes both opening size of the bleed passage 30 and the supply passage 32 to change the displacement.

The pressure sensing member in the control valve 31 may be replaced by a diaphragm.

The present invention may be embodied in a control valve in which the relationship between the level of current to the coil 51 and the target suction pressure is opposite to that of the first embodiment. That is, the present invention may be embodied in a control valve in which the target suction pressure is increased when the value of current to the coil 51 is increased, and the target suction pressure is decreased when the value of current to the coil 51 is decreased.

The computer 37 may initiate the displacement limiting control procedure based on a change amount per unit time of the position of the accelerator pedal, which is detected by the pedal position sensor 35.

Therefore, the present examples and embodiments are to be considered as illustrative and not restrictive and the invention is not to be limited to the details given herein, but may be modified within the scope and equivalence of the appended claims.

What is claimed is:

1. A displacement control device for a compressor that draws and compresses refrigerant gas and changes the displacement in accordance with the pressure in a controlled pressure chamber, comprising:

a control valve for controlling the pressure in the controlled pressure chamber, the control valve having a valve body, a pressure sensing mechanism and an electromagnetic actuator, wherein the pressure sensing mechanism displaces the valve body in accordance with the pressure of refrigerant gas drawn into the compressor, and wherein the electromagnetic actuator adjusts a force applied to the valve body based on the value of a current supplied to the electromagnetic actuator, thereby changing a target suction pressure, which is a reference value for the operation of the pressure sensing mechanism;

a detector for detecting the pressure of refrigerant gas that is drawn into the compressor; and a controller, wherein the controller selects a control procedure from a normal displacement control procedure and a temporary displacement control procedure based on the suction pressure detected by the detector, wherein, when the normal displacement control procedure is selected, the controller sends a current, the value of which is based on external information, to the electromagnetic actuator, and, when the temporary displacement control procedure is selected, the controller sends a current having a specific value to the actuator to maximize the target suction pressure, wherein, when switching from the temporary displacement control procedure to the normal displacement control procedure, the controller changes the value of the current supplied to the electromagnetic actuator in a predetermined pattern over a predetermined period, and determines characteristics of the pattern based on the detected pressure during or at the end of the temporary displacement control procedure.

2. The control device according to claim 1, wherein the compressor is installed in a vehicle, and the device further comprises a pedal position sensor for detecting the position of an accelerator pedal, wherein the controller selects the control procedure based at least on the pedal position detected by the pedal position sensor.

3. The control device according to claim 1, wherein the compressor is installed in a vehicle, the device further comprising a temperature sensor for detecting the temperature of a passenger compartment of the vehicle, and a temperature adjuster for setting the temperature of the passenger compartment, wherein, during the normal displacement control procedure, the controller determines the value of the current supplied to the electromagnetic actuator by referring to the temperature detected by the temperature sensor and the temperature set by the temperature adjuster.

4. The control device according to claim 1, wherein the compressor is connected to an evaporator by a pipe, and wherein the device includes a suction pressure sensor located in the pipe.

5. The control device according to claim 1, wherein the specific value is zero.

6. The control device according to claim 5, wherein the pattern is determined by modifying a simple sloping line that represents a constant increase of the current value from zero to a target value during the period, and wherein the simple sloping line is modified such that the current value is maintained at a constant value during a segment of the period.

7. The control device according to claim 6, wherein the duration of the time segment and the level of the constant value are determined according to the suction pressure detected by the suction pressure sensor.

8. The control device according to claim 7, wherein the duration of the time segment and the level of the constant value are determined according to map data, which is previously stored in the controller, and wherein the map includes the suction pressure as a parameter.

9. A displacement control device for a compressor used in a vehicle air conditioning system, wherein the compressor draws and compresses refrigerant gas and changes the displacement in accordance with the pressure in a controlled pressure chamber, comprising:

a control valve for controlling the pressure in the controlled pressure chamber, the control valve having a valve body, a pressure sensing mechanism and an electromagnetic actuator, wherein the pressure sensing mechanism displaces the valve body in accordance with the pressure of refrigerant gas drawn into the compressor, and wherein the electromagnetic actuator adjusts a force applied to the valve body based on the value of a current supplied to the electromagnetic actuator, thereby changing a target suction pressure, which is a reference value for the operation of the pressure sensing mechanism;

a detector for detecting various external information, wherein the detector includes a suction pressure sensor for detecting the pressure of refrigerant gas that is drawn into the compressor; and a controller, wherein the controller selects a control procedure from a normal displacement control procedure and a temporary displacement control procedure based on the external information detected by the detector, wherein, when the normal displacement control procedure is selected, the controller sends a current, the value of which is based on external information, to the electromagnetic actuator, and, when the temporary displacement control procedure is selected, the controller sends a current having a specific value to the actuator to maximize the target suction pressure, wherein, when switching from the temporary displacement control procedure to the normal displacement control procedure, the controller changes the value of the current supplied to the electromagnetic actuator in a pattern over a predetermined period and determines characteristics of the pattern based on the suction pressure detected by the suction pressure sensor during or at the end of the temporary displacement control procedure.

10. The control device according to claim 9, wherein the detector includes a pedal position sensor for detecting the position of a vehicle accelerator pedal, wherein the controller selects the control procedure based at least on the pedal position detected by the pedal position sensor.

11. The control device according to claim 9, wherein the detector includes a temperature sensor for detecting the temperature of a passenger compartment and a temperature adjuster for setting the temperature of the passenger compartment, wherein, during the normal displacement control procedure, the controller determines the value of the current supplied to the electromagnetic actuator by referring to the temperature detected by the temperature sensor and the temperature set by the temperature adjuster.

12. The control device according to claim 9, wherein the compressor is connected to an evaporator by a pipe, and wherein the device includes the suction pressure sensor located in the pipe.

13. The control device according to claim 9, wherein the specific value is zero.

14. The control device according to claim 13, wherein the pattern is determined by modifying a simple sloping line that represents a constant increase of the current value from zero to a target value during the period, and wherein the simple sloping line is modified such that the current value is maintained at a constant value during a segment of the period.

15. The control device according to claim 14, wherein the duration of the time segment and the level of the constant value are determined according to the suction pressure detected by the suction pressure sensor.

16. The control device according to claim 15, wherein the duration of the time segment and the level of the constant value are determined according to map data, which is previously stored in the controller, and wherein the map includes the suction pressure as a parameter.

17. A method of controlling the displacement of a compressor that draws and compresses refrigerant gas, wherein the displacement of the compressor is controlled, at least in part, based on a current supplied to the compressor, the method comprising:

detecting the pressure of refrigerant gas that is drawn into the compressor;

selecting a control procedure from a normal displacement control procedure and a temporary displacement control procedure based on the detected pressure, wherein, when the normal displacement control procedure is selected, the current has a value based on external information and, when the temporary displacement control procedure is selected, the current has a specific value to maximize the target suction pressure;

when switching from the temporary displacement control procedure to the normal displacement control procedure, changing the value of the current in a predetermined pattern over a predetermined period; and determining certain characteristics of the pattern based on the detected pressure during or at the end of the temporary displacement control procedure.

* * * * *